United States Patent [19]

Chern et al.

[11] Patent Number: 5,344,380
[45] Date of Patent: Sep. 6, 1994

[54] RELEASE HANDLE FOR CENTRIFUGE ROTOR AND LID

[75] Inventors: Cory Chern, Mountain View; Harry A. Penhasi, Cupertino, both of Calif.

[73] Assignee: Beckman Instruments, Inc., Fullerton, Calif.

[21] Appl. No.: 954,212

[22] Filed: Sep. 30, 1992

[51] Int. Cl.$^5$ .......................... B04B 7/06; B04B 5/02
[52] U.S. Cl. .......................... 494/12; 494/16; 16/110 R; 403/259; 411/383
[58] Field of Search .................. 494/12, 16, 20, 38, 494/61, 85; 74/543, 545, 548; 16/110 R; 403/16, 259, 261, 378, 379; 81/177.5; 411/383, 385, 395

[56] References Cited

U.S. PATENT DOCUMENTS

| | | | |
|---|---|---|---|
| 1,306,603 | 6/1919 | Mangels | 74/548 |
| 3,361,170 | 1/1968 | Hilton | 81/177.5 X |
| 3,819,111 | 6/1974 | Romanauskas et al. | 494/16 |
| 3,961,745 | 6/1976 | Wright | 494/12 X |
| 4,010,890 | 3/1977 | Wright | 494/20 X |
| 4,344,563 | 8/1982 | Romanauskas | 494/20 |
| 4,360,151 | 11/1982 | Cowell et al. | 494/16 X |
| 4,412,830 | 11/1983 | Strain et al. | 494/12 |
| 4,435,169 | 3/1984 | Romanauskas | 494/20 |
| 4,753,631 | 6/1988 | Romanauskas | 494/12 X |
| 4,850,951 | 7/1989 | Cheng et al. | 494/16 |

FOREIGN PATENT DOCUMENTS 2907789 8/1979 Fed. Rep. of Germany ........ 494/12

OTHER PUBLICATIONS

Instruction Manual of Sorvall F-28/13 & F-28/36 SupraSpeed ® Fixed-Angle Rotors; Published Jul. 1990.

*Primary Examiner*—Timothy F. Simone
*Assistant Examiner*—Charles Cooley
*Attorney, Agent, or Firm*—William H. May; P. R. Harder; Wen Liu

[57] ABSTRACT

A centrifuge rotor lid assembly which includes a handle which allows convenient handling of a centrifuge rotor and facilitates releasing the lid from the rotor after centrifugation. In one embodiment, the lid is provided with a lid knob and a spindle knob in a coaxial sliding arrangement. The lid knob is used to tighten the lid on the rotor body and the spindle knob is used to tighten the rotor to the centrifuge drive spindle. The upper end of the inner knob is provided with a handle which extends perpendicular to the axis of the knob. This handle is used for lifting the rotor after the spindle knob has been unscrewed from the spindle and for unscrewing the lid knob. The lower end of the spindle knob has a pin which cooperatively engages the lower end of the lid knob when the spindle knob is lifted from the rotor and is turned in a direction to unscrew the lid knob. The handle provides the necessary mechanical advantage for a person to exert sufficient torque to unscrew the lid knob without the use of external tools.

10 Claims, 2 Drawing Sheets

RELEASE HANDLE FOR CENTRIFUGE ROTOR AND LID

BACKGROUND OF THE INVENTION

1. Field of the Invention

The present invention relates to centrifugation, and more particularly to centrifuge rotors and lids.

2. Description of Related Art

FIG. 1 shows the sectional view of a prior art "fixed angle" centrifuge rotor 10. The rotor has an axially symmetric body provided with several cavities 12 about the rotor axis. Each cavity is sized and shaped to receive a centrifuge tube 13 containing the sample to be centrifuged. A lid 14 is provided to cover the opening 15 of the rotor to contain aerosol. A lid knob 16 having a threaded end is provided for bolting the lid 14 on the rotor 10. A spindle knob 18 having a shaft is provided for bolting the rotor 10 to the spindle 20 of a centrifuge drive. Several O-ring seals 21–24 are provided for sealing adjoining structures as shown.

Prior to centrifugation, the rotor is positioned on a laboratory bench and centrifuge tubes 13 containing samples are loaded into the rotor cavities 12. Typically, there may be locking and sealing mechanisms for each cavity (not shown). The lid 14 is placed to cover the rotor opening 15 and the lid knob 16 is hand tightened to secure the lid 14 on the rotor 10. The rotor is then carried to the centrifuge and lowered onto the spindle 20. The spindle knob 18 is hand tightened to secure the rotor hub against the spindle.

For some applications, the rotor may be used in a centrifuge which draws a vacuum in the centrifuge chamber. In bioresearch applications, one approach to centrifugation is to suspend the sample in a cesium chloride density gradient forming solution, a technique well known in the art. Upon centrifugation, the sample components separate into regions or bands parallel to the axis of rotation, and at distances from the axis depending on their relative densities.

When centrifugation has been completed and the rotor comes to rest in the centrifuge, air is let into the vacuum chamber when the door to the chamber is opened. The rotor 10 is lifted from the spindle 20 and carried to the laboratory bench where the lid 14 and the centrifuge tubes 13 are removed from the rotor cavities. The handling of the rotor 10 at the end of centrifugation requires special attention. The rotor must be handled carefully in a way such that the separated sample component bands are not disturbed by vibration. Otherwise, mixing of sample components occurs which defeats the principal of centrifugation. In the past, the rotor is handled by holding the bottom and sides of the rotor using both hands of the user. It becomes physically demanding on the user to move the heavy rotor this way, especially when lifting rotors that are over 10 kilograms.

When removing the rotor lid 14 after centrifugation, even though the lid knob 16 had only been hand tightened prior to centrifugation, it has been found that it was necessary to use a tool to loosen the lid knob 16 after centrifugation. This is caused in part by atmospheric pressure on the lid 14. It was experienced that when the rotor is subject to prolong period of vacuum during centrifugation, air in the space under the lid 14 inevitably escapes through the O-ring seals, due to reduction of sealing effect under high centrifugal field. When the outside of the rotor is again at atmospheric condition at the end of centrifugation, it was experienced that a partial vacuum is retained under the lid. The pressure difference gives rise to a large force on the upper surface of the lid which presses the lid tightly against the rotor. When the lid knob is turned in an attempt to lift the lid, this force is overpowering against the hand turning torque capable of a typical user. The user had to use a tool (e.g. a wrench) to provide the additional torque required. Another cause for the increased tightening of the lid knob after centrifugation arises from the increased friction at the O-ring seals and the threads between the lid knob and rotor body as affected by centrifugation (parts expand during centrifugation and contract after centrifugation at different rates).

SUMMARY OF THE INVENTION

The present invention is directed to a lid assembly which includes a handle which allows convenient handling of a centrifuge rotor and provides a means of releasing the lid from the rotor after centrifugation. In the described embodiment, the lid is provided with a lid knob and a spindle knob in a coaxial sliding arrangement. The lid knob is used to tighten the lid on the rotor body and the spindle knob is used to tighten the rotor to the centrifuge drive spindle. The upper end of the spindle knob is provided with a handle which extends perpendicular to the axis of the knob. This handle is used for lifting the rotor after the spindle knob has been unscrewed from the spindle and for unscrewing the lid knob. The lower end of the spindle knob has a pin which cooperatively engages the lower end of the lid knob when the spindle knob is lifted from the rotor and is turned in a direction to unscrew the lid knob. The handle provides the necessary mechanical advantage for a person to exert sufficient torque to unscrew the lid knob, thus avoiding the need for an external tool such as wrenches.

DESCRIPTION OF THE ILLUSTRATED EMBODIMENTS

The following description is of the best contemplated mode of carrying out the invention. This description is made for the purpose of illustrating the general principles of the invention and should not be taken in a limiting sense. The scope of the invention is best determined by reference to the appended claims.

Figure 1:
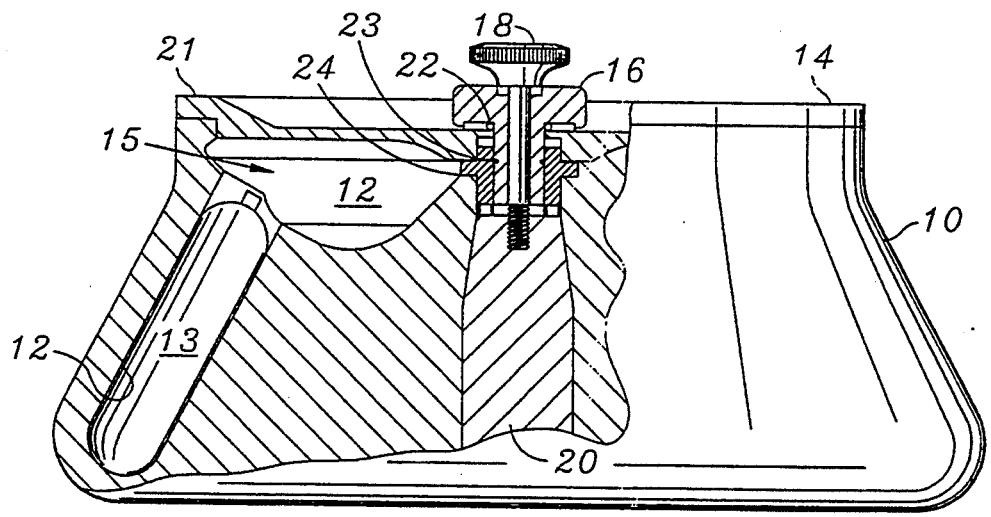
FIG. 1 is a partial sectional view of a prior art centrifuge rotor.
Figure 2:
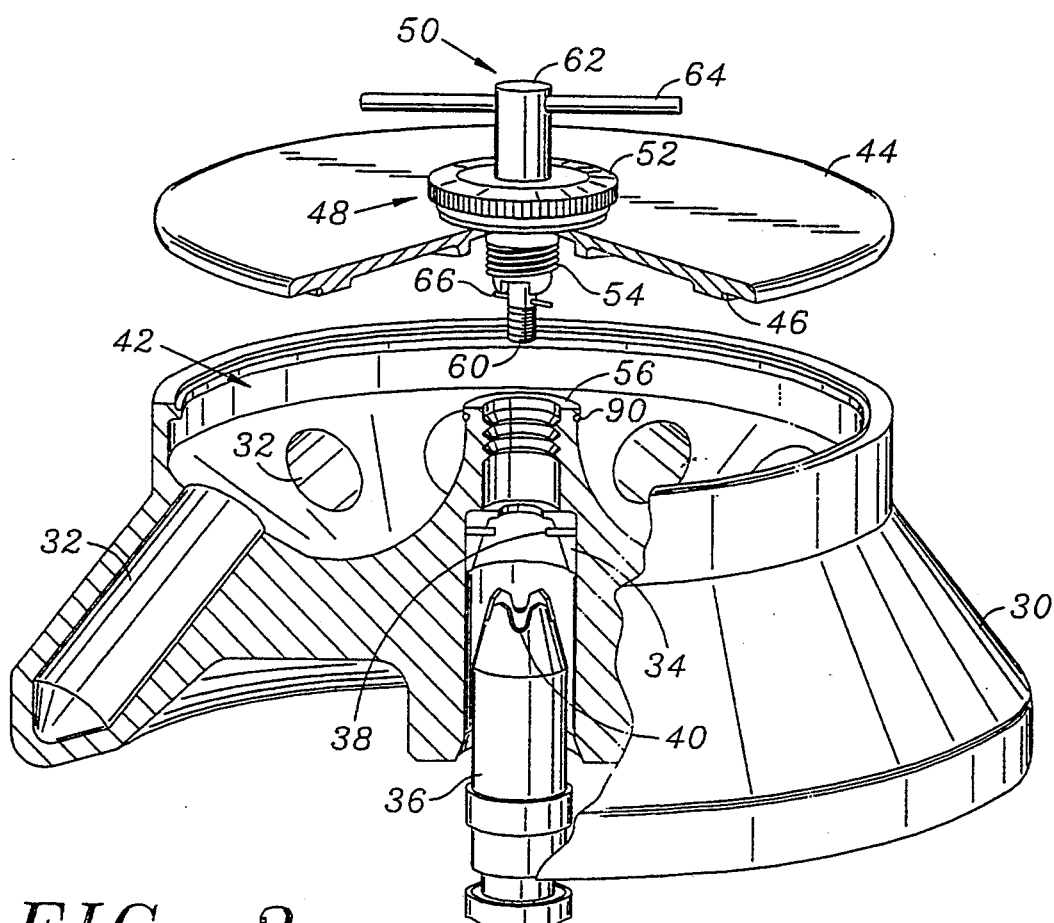
FIG. 2 is a exploded perspective view (partially broken away) of a centrifuge rotor and lid assembly in accordance with one embodiment of the present invention.
Figure 3:
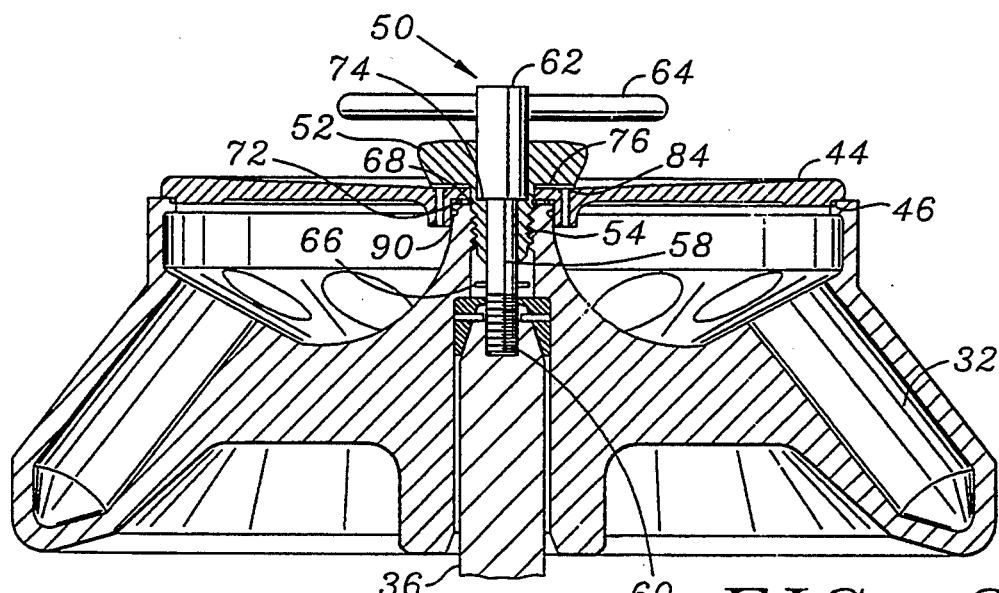
FIG. 3 is a sectional view of the rotor and lid assembly of FIG. 2.

Referring to FIGS. 2 and 3, a centrifuge rotor 30 is shown which has a number of cavities 32 shaped and sized for receiving centrifuge tubes. At the hub of the rotor, an adaptor 34 is inserted for fitting onto a spindle 36 of a centrifuge drive (not shown). Dowel pins 38 are provided on the adaptor 34 for positive engagement with the cutouts 40 on the spindle 36.

At the top of the rotor, there is an opening 42 exposing the cavities 32. A lid 44 is sized to fit over the opening 42. An O-ring 46 is provided at the rim of the lid for sealing the lid to the rotor opening. A lid knob 48 and a spindle knob 50 are coaxially coupled through the center of the lid. The knobs are free to rotate and slidable relative to each other. The lid knob 48 has an enlarged end 52 and a threaded end 54 for bolting onto the raised central portion 56 of the rotor to securely cover the rotor with the lid 44.

The spindle knob 50 is longer than and extends coaxially through the lid knob 48. The spindle knob 50 has a shaft 58 having a threaded end 60 and an end 62 having a horizontal handle 64 extending perpendicular to the shaft 58. The threaded end 60 is for bolting to the centrifuge drive spindle 36 to secure the rotor on the spindle. A pin 66 is inserted through the side of the shaft 58 above the threaded end 60.

Figure 5:
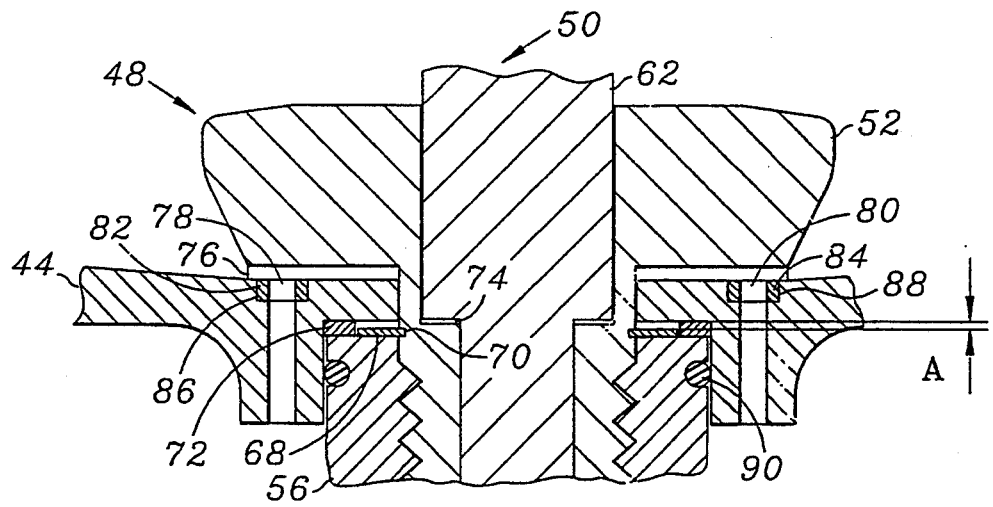
FIG. 5 is a sectional view showing the details at the coupling between the lid and the knobs.

Referring to FIG. 5, details of the coupling of the knobs to the lid 44 is shown. The lid knob 48 has a split retaining ring 68 which biases radially inward under its spring force. This retaining ring 68 sits in a groove 70 in the lid knob 48 and it retains attachment of the lid knob 48 onto the lid 44. To prevent this retaining ring 68 from opening under high centrifugal field, a split retaining ring 72 which biases radially outward under its spring force is press fitted into the lid 44 at the region about the retaining ring 68. When the lid knob 48 is tightened onto the rotor 30, the raised central portion 56 of the rotor prevents the retaining ring 68 from dislodging from its location. A belleville spring washer 74 is provided between the flange of the spindle knob 50 and the flange of the lid knob 48. This washer generates a preload when the spindle knob 50 is tightened on the spindle 36, so as to prevent the rotor from detaching from the spindle 36 as a result of rotor vibration during centrifugation. A teflon spacer 76 is provided under the enlarged end 52 of the lid knob 48, which will reduce the friction when the lid knob is in rotational contact with the top of the lid 44. Two vent holes 78 and 80 are provided on the lid 44 below the enlarged end 52 of the lid knob 48. For each vent hole, a nylon insert (82, 84) is pressed into a counterbore (86, 88) at the top surface of the lid 44. When the lid knob 48 is tightened, the teflon spacer 76 and the nylon inserts 82 and 84 seal the vent holes 78 and 80. The function of the vent holes will be more apparent below. Around the raised center portion 56 is a channel provided with an O-ring 90 for further sealing of the lid 44.

It is noted that in the tightened position of the lid knob 44, there is a small gap A between the retaining ring 68 and the adjacent bottom surface of the lid 44. When the lid knob 48 is initially loosened from the rotor 30, say about one-half turn, the retaining ring 68 will take up this gap A before it lifts on the adjacent bottom surface of the lid. In this instance, the teflon spacer 76 is no longer in sealing contact with the nylon inserts 82 and 84.

Figure 4A:
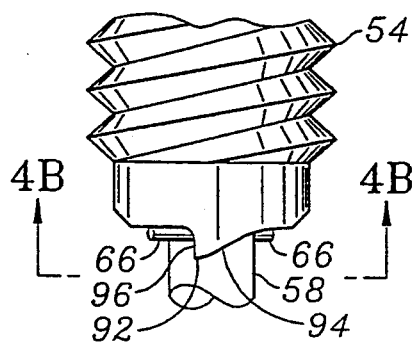
FIG. 4A is a side view of the tip of the lid lock.
Figure 4B:
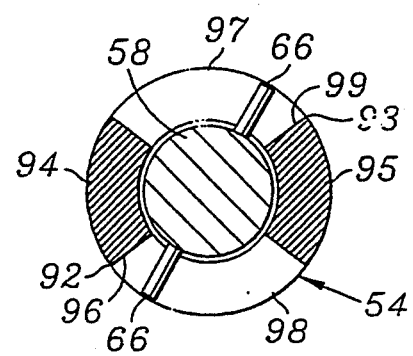
FIG. 4B is a bottom view of the lid lock taken along line 4B—4B in FIG. 4A.

Referring to FIGS. 4A and 4B, the tip of the threaded end 54 of the lid knob 48 has a surface structure which provides uni-direction rotational engagement with the pin 66 on the spindle knob 50. This pin 66 will cooperatively engage with the uni-directional structure on the tip of the lid knob 48. Specifically, the bottom surface of the threaded end 54 of the lid knob 48 has two ridges 92 and 93 occupying two sectors of the tip annulus. Each ridge has a gentle slope or cam surface (94, 95) on one side of the ridge and a shoulder (96, 99) (may be a steep or vertical slope, or a recessed edge) on the other side. Looking at FIG. 4B, the pin 66 will slide over the slopes 94 and 95 when the shaft 58 of the spindle knob 50 is turned towards the slopes. However, the pin 66 will latch against the shoulders 96 and 99 when the shaft 58 is turned towards the shoulders. There are two flat sectors 97 and 98 between the ridges 92 and 93.

The procedures for handling the rotor 30 before and after centrifugation will now be discussed. To prepare for centrifugation, the rotor 10 is typically set on a laboratory bench while centrifuge tubes containing samples to be centrifuged are loaded into the rotor cavities 32. The lid 44 is placed over the rotor opening 42 and the lid knob 48 is hand tightened onto the central portion 56 of the rotor. For purposes of discussions hereinafter, the spindle 36 rotates counterclockwise when viewed from the top. The lid knob 48 therefore is configured to be tightened clockwise. The rotor is moved to the centrifuge by conveniently lifting on the handle 64. The rotor 30 is lowered onto the spindle 36 in the centrifuge and the handle 64 is turned by hand to tighten the spindle knob 60. It is noted that the length of the shaft 58 of the spindle knob 50 is chosen in relation to the spindle 36 such that unless the lid knob 48 has been properly seated on the rotor 30 and tightened, and that the rotor 30 has been properly seated onto the spindle 36 with the pins 38 located in the cutouts 40 of the spindle 36, the end 60 of the spindle knob 50 will not reach the internal threads on the spindle 36. This provides an additional safeguard to ensure that the rotor 30 and lid 44 have been seated properly by the user before beginning centrifugation.

For purpose of discussion herein, the rotor is used in a centrifuge which draws a vacuum inside the centrifuge chamber to reduce aerodynamic friction at high speed operations. During centrifugation, some of the air under the rotor lid 44 may escape into the vacuum outside of the rotor.

At the end of centrifugation, the vacuum is released in the centrifuge. It is noted that the inside of the rotor may still be under partial vacuum. The imbalance in atmospheric pressure therefore exert a force on the lid. The handle 64 is turned counterclockwise to completely loosen the spindle knob 50 from the spindle threads. At this stage, the pin 66 on the shaft 58 of the spindle knob is just below the uni-direction structure at the bottom tip of the lid knob 48. Further turning in the counterclockwise direction does not engage the pin 66 against the structure, unless the spindle knob 50 is lifted and turned.

The handle 64 is lifted to remove the rotor from the centrifuge and move the rotor to a bench. As the handle is lifted, the pin 66 will always end up in contact with the flat spots 97 and 98 at the bottom end of the lid knob 48 because of the pin 66 slips on the cam surfaces 94 and 95. Since the handle 64 is coupled to the spindle knob 50 which is vertically in line with the center of mass of the rotor 30, and the rotor center of mass is low compared to the vertical location of the handle, there is a tendency for the massive rotor to remain stabilized under its own weight when it is moved about by the handle 64. Consequently, the separated sample components in the rotor are not disturbed as to cause mixing.

To loosen the lid knob 48, instead of turning on the enlarged end 52 of the lid knob, the handle 64 is lifted and the spindle knob 50 is turned counterclockwise.

The pin 66 on the spindle knob 50 cooperatively engages the shoulders 96 and 99 of the uni-directional structure at the bottom end of the lid knob 48 so as to turn the lid knob 48 in a counterclockwise direction, thereby loosening the spindle knob 50. During the initial one-half turn, the seals at the vent holes 78 and 80 are broken as the enlarged end 52 of the lid knob rises above the lid 44. This causes the pressure on both sides of the lid to equalize. Further turning of the handle 64 and spindle knob 50 causes the lid knob 48 to further unthread from the rotor 30, thereby lifting the lid 44 with the retaining ring 68. Any attempts to turn the spindle knob in a clockwise direction while the handle is lifted will cause the pin 66 to slip over the slopes 94 and 95.

It is noted that the vent holes 78 and 80 on the lid 44 may be omitted entirely. The length of the handle 64 may be sized to provide the leverage for exerting the torque necessary to overcome the high atmospheric pressure force on the lid and other frictional resistance. However, when the vent holes are provided, less torque is needed to be exerted on the spindle knob 50 thereby extending the wear on this component.

It is also noted that the handle 64 may be an integral or fixedly attached part of the spindle knob 50, or it may be a separate and removable part. The handle may be inserted through a through-hole in the spindle knob 50 when lifting of the rotor or untightening of the spindle and lid knobs are desired.

While the present invention has been described in reference to the illustrated embodiments herein, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

We claim:

1. A centrifuge rotor comprising:
   a rotor body defining cavities for receiving samples to be centrifuged;
   a lid covering the top of the rotor body;
   a lid knob coupled to the center of the lid for securing the lid to the rotor body;
   a spindle knob for securing the rotor body to a spindle of a centrifuge, the spindle knob being coaxial and slidable through the lid knob;
   the spindle knob having first engagement means for cooperatively rotating the lid knob only when the spindle knob is rotated in a predetermined direction about an axis; and
   the lid knob having second engagement means for cooperatively engaging with said first engagement means to permit the spindle knob to rotate the lid knob when the spindle knob is rotated in said predetermined direction.

2. A centrifuge rotor as in claim 1 wherein the second engagement means includes a ridge structure at one end of the lid knob, said ridge structure having on one side a shoulder facing in a direction opposite to said predetermined direction, and wherein the first engagement means includes a structure at one end of the spindle knob which is configured to engage the shoulder when the spindle knob is turned in said predetermined direction.

3. A centrifuge rotor as in claim 2 wherein the second engagement means further includes a cam surface on a side of the ridge opposite to the shoulder, whereby said structure on said spindle knob slips on the cam surface when the spindle knob is turned in a direction opposite to said predetermined direction.

4. A centrifuge rotor as in claim 2 wherein the spindle knob and the lid knob are structured such that said end of the spindle knob extends beyond said end of the lid knob such that the spindle knob is slid relative to the lid knob to bring the end of the spindle knob towards the end of the lid knob.

5. A centrifuge rotor as in claim 1 wherein the lid knob includes an enlarged end and the lid includes a vent hole which is located on the lid below said enlarged end whereby the lid knob seals said vent hole when the lid knob is tightened onto the lid and rotor body.

6. A centrifuge rotor as in claim 1 wherein the spindle knob includes a handle extending from the spindle knob for providing leverage for turning the spindle knob.

7. A centrifuge rotor comprising:
   a rotor body defining cavities for receiving samples to be centrifuged:
   a lid covering the top of the rotor body;
   a lid knob coupled to the center of the lid for securing the lid to the rotor body;
   a spindle knob for securing the rotor body to a spindle of a centrifuge, the spindle knob being coaxial and slidable through the lid knob; and
   first and second coupling means carried by the spindle knob and the lid knob respectively for cooperatively rotating the lid knob only when the spindle knob is rotated in a predetermined direction about an axis, the second coupling means including a ridge structure at one end of the lid knob, said ridge structure having on one side a shoulder facing in a direction opposite to said predetermined direction, and the coupling first means including a structure at one end of the spindle knob which is configured to engage the shoulder when the spindle knob is turned in said predetermined direction.

8. A centrifuge rotor as in claim 7 wherein the second coupling means further includes a cam surface on a side of the ridge opposite to the shoulder, whereby said structure on said spindle knob slips on the cam surface when the spindle knob is turned in a direction opposite to said predetermined direction.

9. A centrifuge rotor as in claim 7 wherein the spindle knob and the lid knob are structured such that said end of the spindle knob extends beyond said end of the lid knob such that the spindle knob is slid relative to the lid knob to bring the end of the spindle knob towards the end of the lid knob.

10. A centrifuge rotor as in claim 9 wherein the lid knob includes an enlarged end and the lid includes a vent hole which is located on the lid below said enlarged end whereby the lid knob seals said vent hole when the lid knob is tightened onto the lid and rotor body.

* * * * *